(No Model.) 6 Sheets—Sheet 3.
F. D. MALTBY.
MACHINE FOR PRODUCING STEREOTYPE MATRICES.
No. 339,671. Patented Apr. 13, 1886.
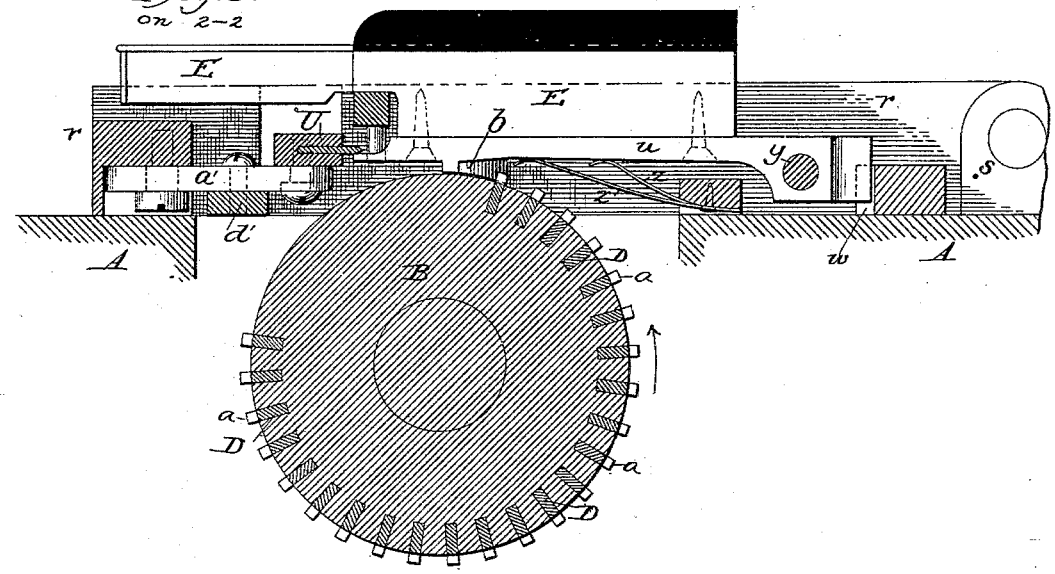
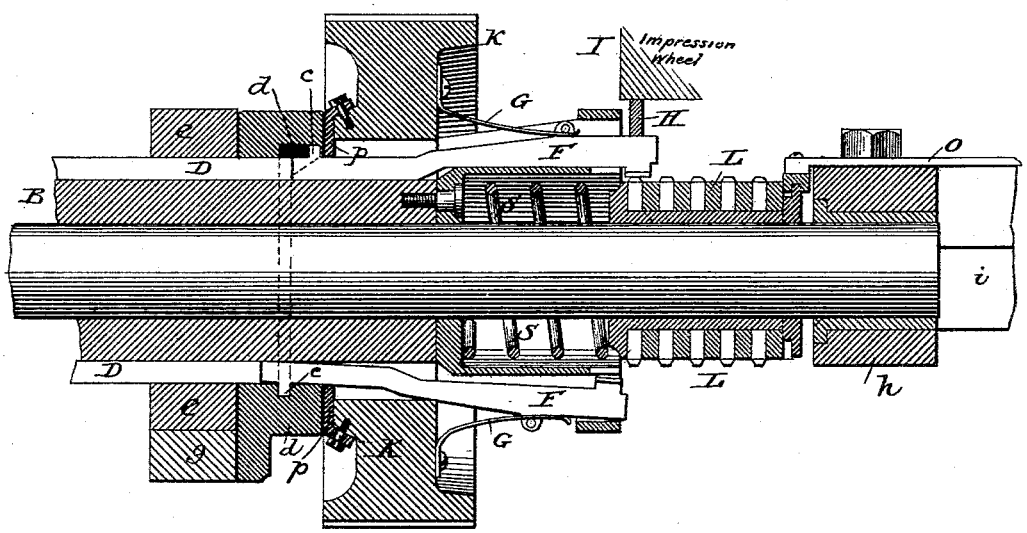
WITNESSES
INVENTOR
F. D. Maltby
By Phil T. Dodge,
Attorney (No Model.) 6 Sheets—Sheet 4.
F. D. MALTBY.
MACHINE FOR PRODUCING STEREOTYPE MATRICES.
No. 339,671. Patented Apr. 13, 1886.
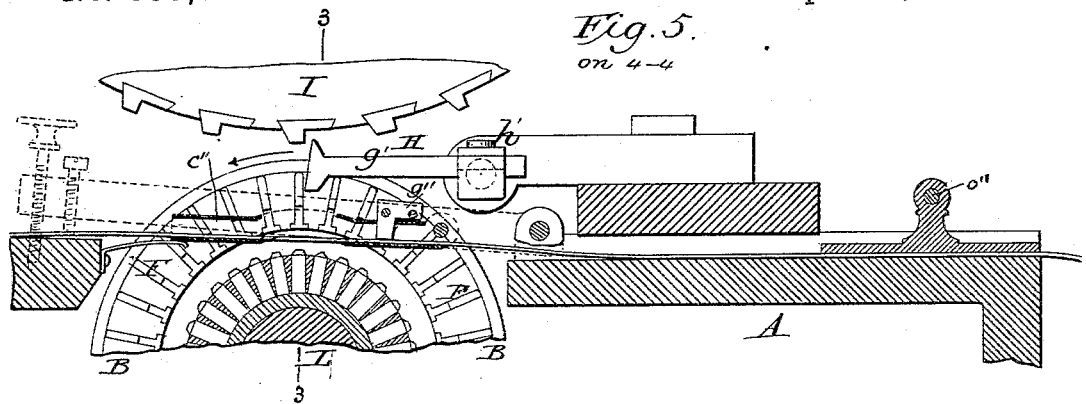
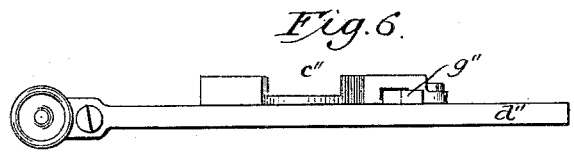
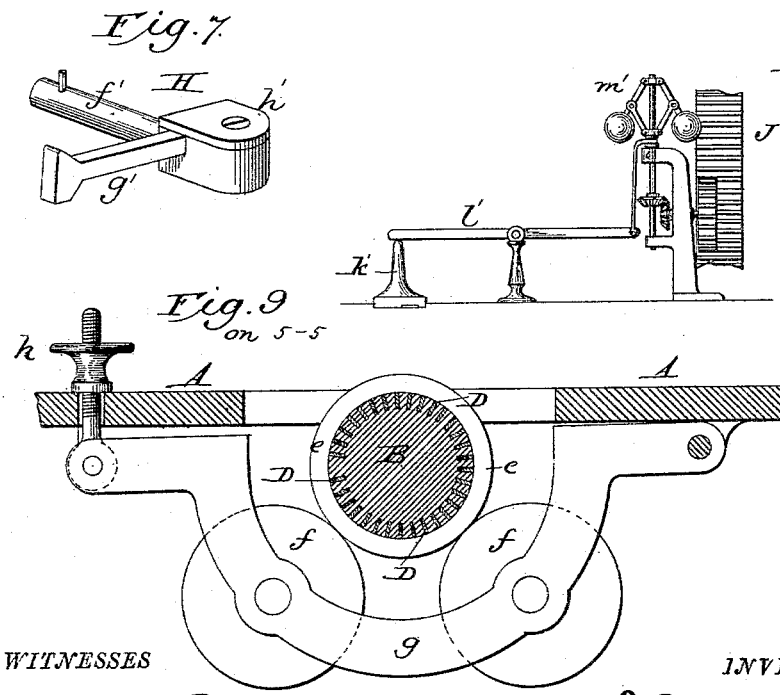
WITNESSES
INVENTOR
F. D. Maltby
By Phil T. Dodge
Attorney (No Model.) 6 Sheets—Sheet 5.

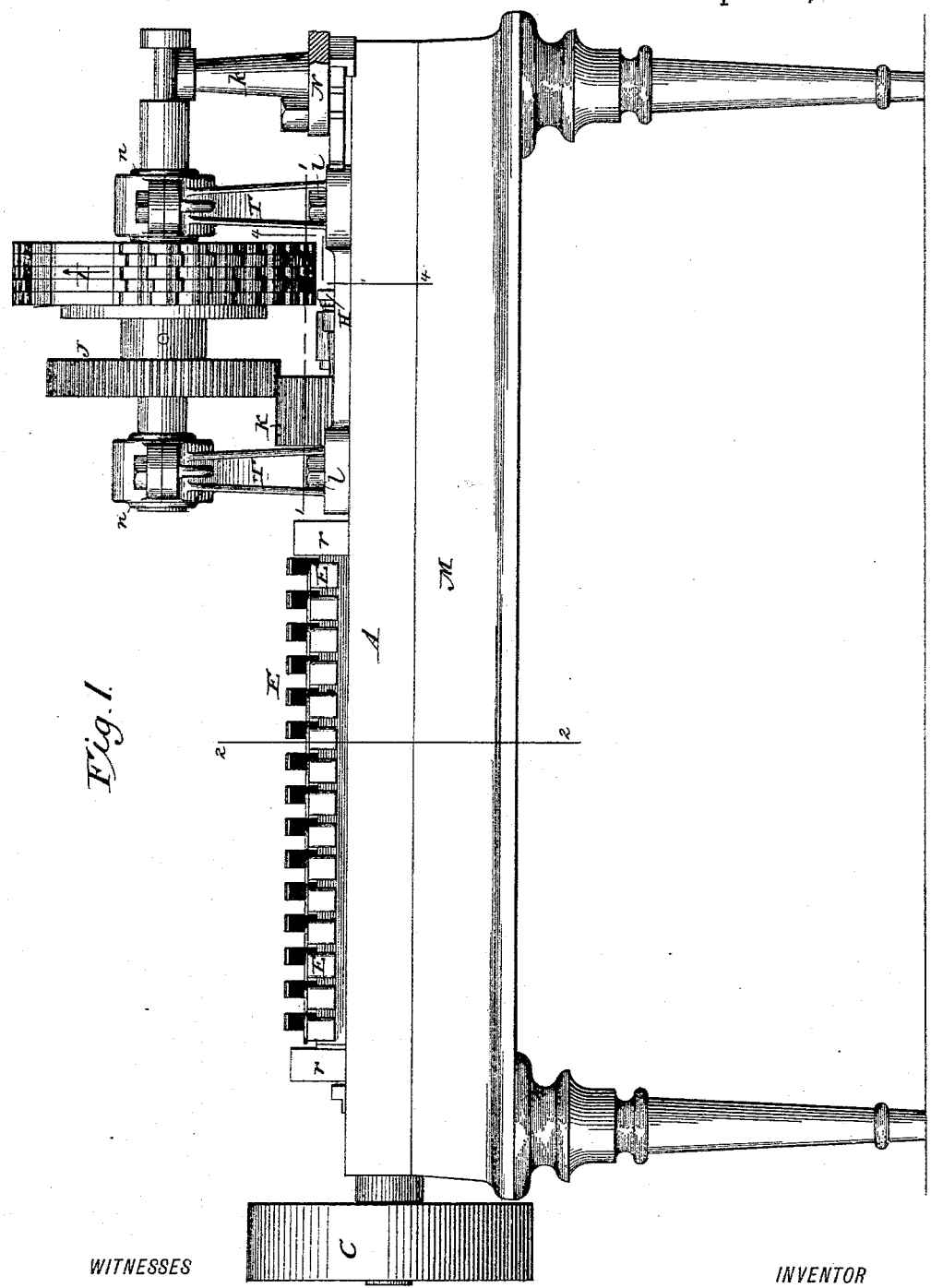

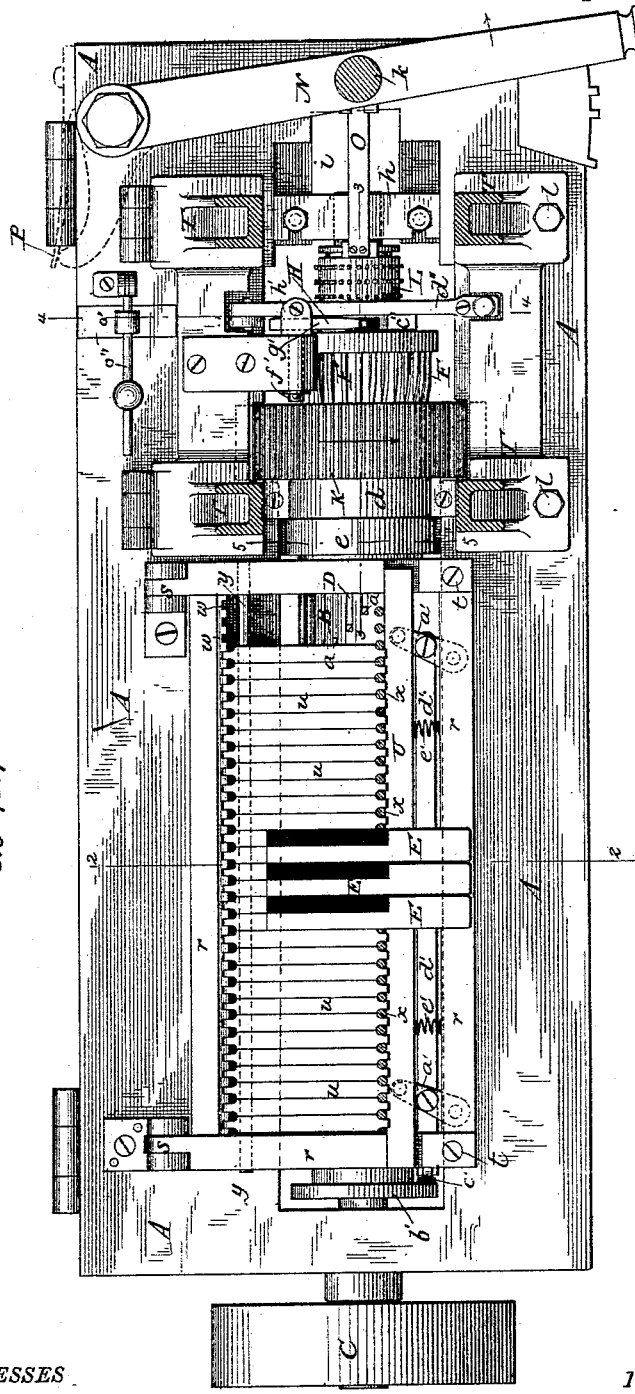

F. D. MALTBY.
MACHINE FOR PRODUCING STEREOTYPE MATRICES.

No. 339,671. Patented Apr. 13, 1886.

on 6-6

WITNESSES
Sidney P. Hollingsworth
Wm H. Shipley

INVENTOR
F. D. Maltby
By Phil T. Dodge,
Attorney (No Model.) 6 Sheets—Sheet 6.

F. D. MALTBY.
MACHINE FOR PRODUCING STEREOTYPE MATRICES.

No. 339,671. Patented Apr. 13, 1886.

WITNESSES
Sidney P. Hollingsworth
W. H. Shipley

INVENTOR
F. D. Maltby
By Phil T. Dodge
Attorney

N. PETERS, Photo-Lithographer, Washington, D. C.

UNITED STATES PATENT OFFICE.

FRANK D. MALTBY, OF WASHINGTON, DISTRICT OF COLUMBIA, ASSIGNOR, BY MESNE ASSIGNMENTS, TO THE NATIONAL TYPOGRAPHIC COMPANY, OF SAME PLACE.

MACHINE FOR PRODUCING STEREOTYPE-MATRICES.

SPECIFICATION forming part of Letters Patent No. 339,671, dated April 13, 1886.

Application filed November 3, 1884. Serial No. 147,132. (No model.)

*To all whom it may concern:*

Be it known that I, FRANK D. MALTBY, of Washington, in the District of Columbia, have invented certain Improvements in Machines for Producing Stereotype-Matrices, &c., of which the following is a specification.

This invention has reference more particularly to improvements in machines of the type represented by the Letters Patent of the United States granted to Ottmar Mergenthaler on the 26th day of August, 1884, No. 304,272.

It is the object of the invention to simplify the machine, reduce the cost of construction, facilitate the examination and disconnection of its parts, and to avoid various minor difficulties which were encountered in the practical operation of the machine as originally constructed.

Figure 10:
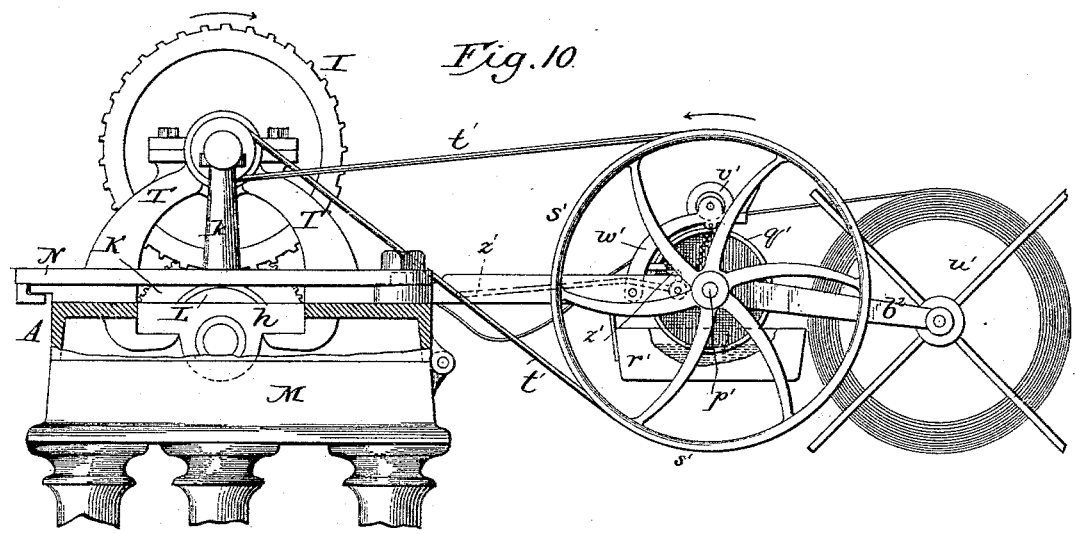
Figure 12:
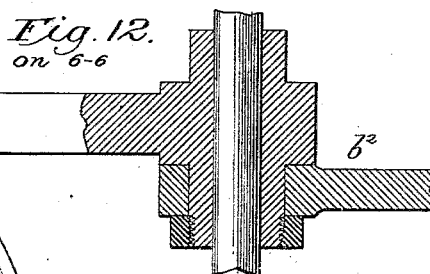
Figure 11:
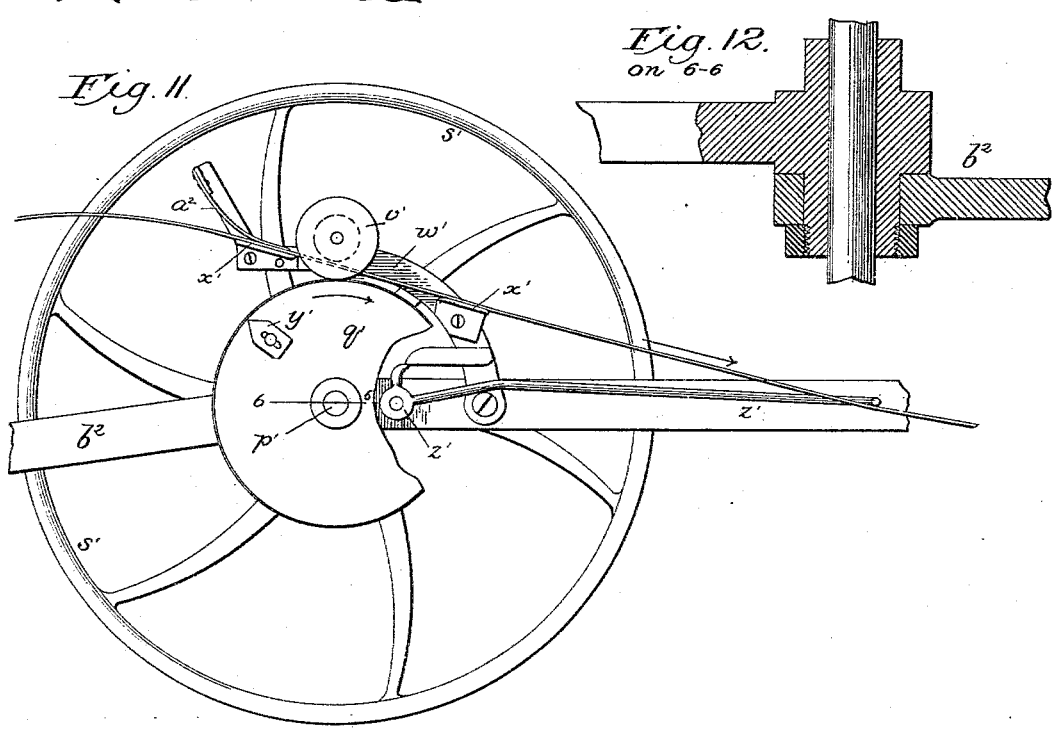
Figure 13:
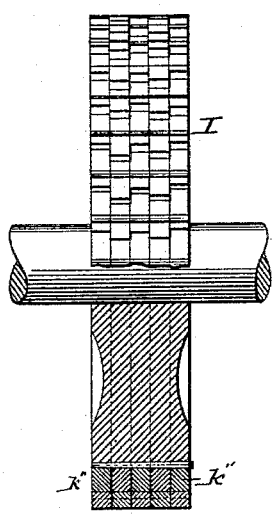
Figure 14:
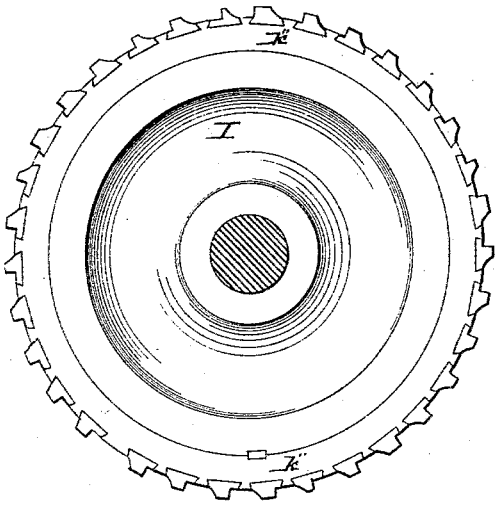
Figure 15:
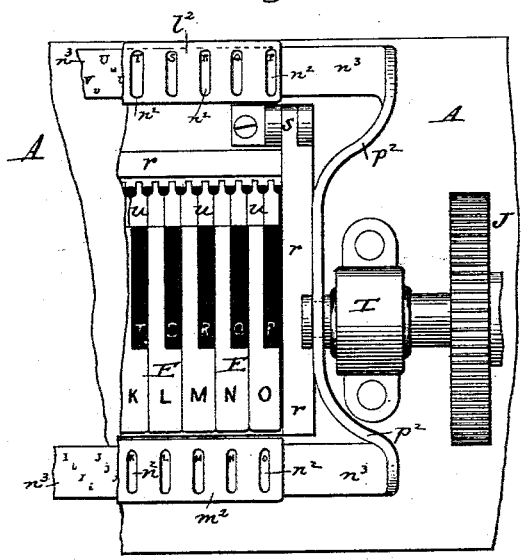

Referring to the accompanying drawings, Figure 1 represents a front elevation of the machine. Fig. 2 represents a top plan view of my machine, the pressure or feed wheel being removed, and its supporting-standards represented in section on the line 1 1 of Fig. 1, and a portion of the finger-keys also removed in order to expose the parts thereunder. Fig. 3 is a vertical cross-section on the line 2 2 of Figs. 1 and 2. Fig. 4 is a longitudinal vertical section through one end of the machine on the line 3 3 of Figs. 2 and 5. Fig. 5 is a vertical section on the line 4 4, looking toward the main cylinder and feed-wheel. Fig. 6 is a top plan view of the feed throat or passage. Fig. 7 is a perspective view of the feed-dog. Fig. 8 is a side elevation of the automatic pressure device for controlling the tension of the matrix strip or blank. Fig. 9 is a vertical cross-section on the line 5 5, Fig. 2, showing the intermediate bearing or support for the main cylinder. Fig. 10 is an end elevation of the head of the machine, partly in section, showing the feed mechanism, and also the manner in which the removable bearing in the main cylinder is sustained in the bed-plate. Fig. 11 is a side elevation, partly in section, of the feed mechanism. Fig. 12 is a cross-section of the same on the line 6 6. Fig. 13 is an edge view, partly in section, of the feed-wheel. Fig. 14 is a side elevation of the same. Fig. 15 is a top plan view of one end of the machine with the indicator to show the position of the type-wheel.

As regards the general construction and arrangement of its various parts, the present machine is essentially the same as that represented in the Mergenthaler Patent, before referred to. A bed-plate, A, is provided on the under side with bearings, which support the horizontal main cylinder B, which receives motion from a driving-pulley, C, applied to one of its journals. A series of slides, D, equal in number to the characters in each line encircling the type-wheel, are arranged to slide in longitudinal grooves formed in the circumference of the cylinder. Each rod has at its inner or rear end a radial projection, $a$, the series of projections being arranged to encircle the cylinder in a spiral line. A series of finger-keys, E, equal in number to the slides, are pivoted on the main frame, and each provided on the under side with an inclined or oblique surface, $b$, the series of surfaces being arranged commonly in a straight line extending lengthwise of the cylinder. The parts are so arranged that whenever a key is depressed during the rotation of the cylinder its inclined surface will encounter the heel end or projection of the corresponding slide and cause the latter to be moved momentarily toward the right. Each key operates its particular slide and no other. The outer or forward end of each slide abuts against the end of a secondary slide or pressure-dog, F, which is mounted in the same groove, and which forms in effect a prolongation or continuation thereof. In the normal position of the parts the main slide and the pressure-dog are retracted or drawn backward into the cylinder. When, however, a slide is moved by the action of its finger-key, it pushes the corresponding pressure-dog outward, so as to project its end beyond the cylinder into position for printing, as plainly indicated in Fig. 4, in which the dog at the top of the cylinder is shown in its projected position. The pressure-dogs F are free to move not only in a longitudinal direction, as before described, but also to a limited extent in a radial direction. Their outer ends are acted upon by lifting-springs G, which tend to urge them outward radially. Each dog, when in its projected position, is urged inward toward the center by means of a feed-dog, H, pivoted to the main frame, the feed-dog being in turn acted upon by cam-surfaces on the periphery of feed-wheel I. This wheel I is mounted on the same shaft with a gear-wheel, J, which engages a corresponding wheel, K, secured to the cylinder, the parts being so proportioned that the feed-wheel I and the cylinder revolve in equal times. Whenever a key is depressed, the corresponding slide and pressure-dog are projected in advance of the feed-dog H. On the shaft of the cylinder there is secured a type-wheel, L, bearing on its periphery one or more series of male type or dies arranged in circumferential lines and fixed firmly in position therein. This wheel is arranged to slide lengthwise on the cylinder-shaft without turning thereon, so that one or another of its lines of type may be brought directly beneath the feed-dog H. Each circumferential line contains the same number of type that there are pressure-dogs in the machine, each type being arranged in line radially with a corresponding dog, so that whenever a particular dog is projected it will stand directly opposite the face of its corresponding type, as represented in Figs. 4 and 5. Whenever a particular key is depressed the corresponding slide and pressure-dog will be projected in advance of the dog H. The projected dog, being carried forward by the rotation of the cylinder, will pass beneath the feed-dog at the instant that it reaches the printing-point at the top of the cylinder, and at the same moment the appropriate elevation or feed-surface on the wheel I will act on the feed-dog H and force the same downward, causing it in turn to urge the pressure-dog F inward toward the type, in order to force the paper or matrix strip, which is introduced between the bar and said dog F, firmly against the type. This pressure continues but an instant, for as soon as the feed-surface on the feed-wheel I passes from the dog H the latter rises, releasing the pressure-dog F, which in turn releases the strip from the type. The retraction of the pressure-dog into the cylinder immediately follows. This retraction is effected by means of studs $c$, formed on the rear ends of the dog F, as shown in Fig. 4, and arranged to travel in a groove formed in the interior surface of a stationary ring, $d$, which encircles the cylinder. One side of this groove encircles the cylinder in a plane at right angles thereto, so that the heels of those dogs which are not projected will continue to traverse said groove. On one side the groove is widened at the top, as in Fig. 4. When a dog is urged to the right by the action of a key its heel will enter this widened portion and ride therein until after the dog has passed the printing-point, when the inclined wall of the groove will act to restore the dog to its original position.

The foregoing parts are of substantially the same construction as those in the original Mergenthaler machine, and are not broadly claimed as of my invention. They have been described as above in order that the details of construction which are to follow may be perfectly understood.

In proceeding to construct the machine I provide a strong flat bed-plate, A, in one piece, and with a central opening of the form represented in Fig. 2. This bed-plate, which gives support to the operative parts of the mechanism, I hinge at one edge to the top of a rectangular metal frame, M, which is cast complete in one piece and mounted on three legs, as represented in the drawings. Being seated directly on the metal frame, and sustained thereby throughout its entire length, the bed-plate is free from those vibrations and from the liability to spring in the middle which occur in the machines hitherto in use. The hinging of the bed-plate to the frame permits the entire mechanism to be readily and safely turned to an upright position to afford access to its under side.

Hitherto it has been the custom to sustain the main cylinder by means of bearings at its two extremities only, in consequence of which it was found that the severe strains encountered in operation would cause it to spring or yield at the middle. Owing to the peculiar construction of the cylinder and attendant parts, it was deemed impossible to apply a bearing at a point between its ends. One of my improvements relates to a construction under which I am enabled to practically apply these intermediate bearings. As represented more particularly in Figs. 2, 4, and 9, I secure firmly around the cylinder, immediately in rear of the gear-wheel K, a metal ring or collar, $e$, which I support in a rigid bearing of any suitable character connected to the main frame. An ordinary box or bearing bolted to or formed upon the bed-plate and adapted to encircle the ring $e$ will answer an excellent purpose; but I prefer to support the ring on anti-friction rollers $f$, mounted in an arm, $g$, one end of which is pivoted to the under side of the bed-plate, while the opposite end is sustained by a screw and thumb-nut, $h$, as plainly represented in Fig. 9. By adjusting the nut the rollers may be elevated to compensate for wear. The rollers thus applied will afford a firm and rigid support to the cylinder near the point at which it receives greatest downward strain or pressure, perfectly overcoming that inequality of impression which was liable to occur in the original machine in consequence of the yielding of the cylinder. It is to be noted that, owing to the employment of the ring, the intermediate support produces no wear upon the cylinder proper. It is further to be noted that the ring serves the additional purpose of confining the ends of the slides in position in the grooves of the cylinder.

In the machine as originally constructed much difficulty was encountered in removing the type-wheel therefrom, the construction being such that it was necessary to disconnect and remove various parts to gain access thereto. To avoid this trouble I support the forward end of the cylinder-shaft in a box or bearing, $h$, seated in a depression, $i$, in the main frame, as shown in Figs. 2 and 10, the depression being of such form as to permit the bearing to be slipped endwise from the shaft. The bearing is retained in place by means of bolts passing through lateral slots, so that after the bearing has been moved to one side it may be lifted out of place, thus exposing the end of the shaft, so that the type-wheel L may be slipped therefrom and removed through the top, the bed-plate being elongated for this purpose. This may be done without disturbing the bed-plate, as heretofore required.

In the present machine, as in the original, the type-wheel and the feed-wheel I are both arranged to move laterally, in order to present the different lines or wheels of type and the corresponding feed-surfaces in position to operate. The movement of these parts was effected by means of a hand-lever, N, having a complicated connection therewith, while their return was effected by means of a spiral spring acting endwise against the journal of the feed-wheel.

For the purpose of simplifying the lever and its connections, and of dispensing with the original spring, I adopt the construction represented in Figs. 1 and 2. The lever N, of a straight form, is now pivoted directly on top of the bed-plate and provided midway of its length with a standard, $k$, carrying on its upper end an anti-friction roller, which bears in a groove or between collars on the end of the feed-wheel shaft, so that the movement of the lever to the right or left imparts positively a like movement to the wheel. The type-wheel is provided near one end with a circumferential groove, in which there engages a slide secured to or formed on one end of an arm, O, which latter is pivoted to the under side of the lever N, so that the movement of the lever effects the adjustment of both the type-wheel and the feed-wheel in a positive manner. A locking-plate or equivalent device on the main frame to engage the lever N serves to hold the wheels in their proper adjustments.

The construction above described for adjusting the wheels is advantageous, not only because of its greater simplicity, but because the motions are positive, because they run with less friction, and because the objectionable side strain or friction is avoided. The spiral spring S may be applied around the main shaft to urge the type-wheel outward, as shown in Fig. 4; but this spring is not a necessary feature. A spring, P, may also be applied to act on the rear end of the lever N, and urge the same in the direction indicated by the arrow, in order that the parts may run without noise or clatter; but this spring may also be omitted.

In practice it is frequently desirable to gain access to the top of the cylinder, the feed-throat, and adjacent parts. In the machine as originally constructed this could be accomplished only by disconnecting the feed-wheel, its standards, and other parts from the machine. To avoid the delay and labor involved in this operation I now cast the two standards T, by which the two ends of the feed-wheel shaft are sustained, in one piece, and hinge them at the rear side to the bed-plate, as shown in Fig. 2, and secure them at the front side by means of thumb-screws or equivalent fastening devices, $l$, which may be readily disconnected, so as to admit of the standards being turned backward, carrying with them the feed-wheel and upper gear-wheel, J, and thereby exposing the parts below them. When the upper parts are thus thrown backward, the lower parts will be presented in the manner represented in Fig. 2. The standards are provided at the top with removable half-boxes, of ordinary construction, which serve to confine firmly in position steel or other suitable bearings, $n$, in which the ends of the shaft revolve. When worn, these bearings, in the form of rings, may be quickly removed and replaced by others. The formation of the standards in one piece is advantageous, in that it admits of their being readily and accurately bored to receive the shaft, and, also, in that it prevents the bearings from being thrown out of line under any circumstances.

In the original machine the pressure-dogs or slides F could only be removed after a removal of the bearings of the cylinder and various other parts—an operation requiring considerable time and attended with much difficulty. To avoid trouble in this regard, and permit the instantaneous removal of either dog independently, I make the cylinder and the internal opening in the gear-wheel of such size as to admit of the heel end of the dogs being drawn outward endwise through the same.

To prevent the accidental escape of the dogs, I apply a divided or sectional plate or ring, $p$, at the rear side of the gear K. This ring is most conveniently screwed to and arranged to revolve with the gear, as shown in the drawings; but it may be fixed in position should circumstances render it desirable so to do.

In the machine as originally constructed no provision was made for giving access to the under side of the key-board and the upper side of the cylinder. These parts could only be examined and cleaned after unbolting and removing the key-board and various other parts. I now attach the keys to an independent frame, $r$, which I denominate the "key-board frame," and which I hinge at its rear edge to the bed-plate, as shown at $s$, Figs. 2 and 3, this construction permitting the entire key-board to be turned upward at any time, giving access to the under side of the keys, the upper side of the cylinder and rods, and of the parts adjacent thereto. The key-board may be fastened down at its forward edge by means of thumb-screws or equivalent fastenings, t; but in most cases its weight will be sufficient to retain it in position.

In the use of the original machine it was found that the lateral strain applied to the keys through the action of the slides on their inclined surfaces would cause the keys to become loose, so as to play sidewise. To remedy this evil, I construct a key-board and frame in the manner represented in Figs. 2 and 3. Each key consists, as in the original machine, of the key or finger-piece proper and of a metal plate, $u$, upon which the rear end of the key is firmly secured. In the original machine the key-plates $u$ were notched centrally at the ends and guided by small vertical pins. I now cut away the sides of the plates at the two ends in such manner as to reduce their width and form tenons thereon. The rear ends of the entire series of plates I seat in vertical grooves $w$ in the key-board frame. Being thus sustained, the key-plates are permitted to play vertically with perfect freedom, while at the same time they are firmly sustained against lateral pressure. They are secured in place by and turn upon a pivot-rod, $y$, passed through their rear ends and seated at the extremities in the key-board frame, as shown.

Instead of employing spiral springs, as in the original machine, to lift the keys to their normal position, I make use of flat springs $z$, applied as in Fig. 3, the springs being securely fastened to the bed-plate at one end and arranged to act at the opposite end in the key-plates. I employ, as in the original machine, a locking-bar, U, which is reciprocated at each rotation of the cylinder in such manner as to engage with and hold down in an operative position those keys which are at the moment depressed, for purposes fully explained in the original patent. The bar was formerly moved toward the keys by a spring, and away from the keys by means of cams mounted directly on the ends of the cylinder, the construction being such that the cams were compelled to have a rise or lift equal to the movement of the bar. It was found in practice that when the cams were thus constructed they would throw the bar backward with objectionable violence. To overcome this trouble, I mount the locking-bar on two horizontal swinging links, $a'$, which are pivoted at their rear ends to the key-board frame. At one end of the cylinder I apply a wheel or collar, $b'$, having on its side face a cam, $c'$, which acts against the end of a bar, $d'$, connected to the two links midway of their length. The cam urging the bar endwise causes it to swing the links in such manner as to force the locking-bar U away from the lips of the finger-key. Owing to the fact that the actuating-bar $d'$ is applied to the middle of the links, it follows that a slight movement of this bar will produce a greater movement of the locking-bar. Consequently I am permitted to use an operating-cam having slight rise or lift, the result of which is, that the parts run smoothly and with little noise. The action of the cam is opposed by a spring, $e'$, which urges the locking-bar forward.

It is to be observed that the key-locking devices are carried upward with the key-board when it is turned back from the cylinder.

Reference was before made to springs G acting to lift the pressure-dogs or slides F. These springs are now attached to the face of the wheel K, independently of each other, and act beneath ears on the slides. This construction is advantageous in that the springs are exposed, so that they may be cleaned and lubricated, and that they may be instantly removed and replaced by others in the event of their becoming inoperative. This arrangement is also a decided improvement on that of the original machine, which had the springs seated in the grooves beneath the dogs.

Reference has hitherto been made to the dog H, by which the pressure was transmitted from the feed-wheel to the pressure-dogs or slides to force the paper against the type. This dog was originally made in one piece—a form which rendered its construction expensive and its removal a matter of inconvenience. My improved dog is constructed in the form represented in Fig. 7. It consists of two parts—a spindle, $f'$, and an arm or dog proper, $g'$. The spindle $f'$, designed to be seated loosely and permanently in the frame, consists of a short shaft or spindle proper, having at one end a transversely-grooved head, in which the end of the arm $g'$ is seated and secured by means of a covering-plate, $h'$, fastened by a screw. It will be observed that the dog $g'$ has a straight arm or body, with a beveled head at one end. It may be readily punched from sheet metal or drop-forged, and cheaply ground or otherwise finished to the required form. By simply loosening the plate $h'$ the removal or adjustment of the dog is permitted.

In machines of this class the feeding of the paper is effected by the action of the type and the pressure-dog, which move forward a short distance while holding the paper strip between them, and which consequently advance the strip a sufficient distance to present the blank surface to the next type which may be brought into action.

Experience has shown that changes in the speed of the machine frequently cause an irregular or uneven feeding of the paper, so that a proper spacing between the characters cannot be obtained. It is found that when the machine is driven at high speeds there is a tendency of the paper to feed too rapidly in proportion to the speed of the type. To avoid this difficulty, I propose to apply an automatic device actuated by the machine to control the tension of the paper. This device may be variously constructed, the essential requirement being that the resistance which it offers to the paper shall increase as the speed of the machine is increased, and vice versa. I recommend as the most simple form of embodiment that represented in Fig.

8. The paper strip or blank is introduced through a groove in the bed-plate, and is acted upon by a friction-plate, $k'$, which is connected through a lever, $l'$, with an ordinary ball-governor, $m'$, which is connected with and driven from the gear-wheel J of the machine, or from any suitable moving part of the machine. Under this arrangement increase in the speed of the machine will be followed by an increased resistance to the movement of the paper, the tension of which will be increased to correspond. The essence of this part of my invention consists in increasing and decreasing the tension of the paper by devices dependent for their action upon variations in the speed of the machine.

As an additional and independent means of controlling the tension of the paper, I propose to employ, as shown in Fig. 2, a friction-plate, $o'$, attached to a weighted lever, $o''$, as represented in Fig. 2, the weight being adjustable lengthwise of the lever, in order that the pressure on the paper may be increased or diminished.

In order to secure a satisfactory action of the machine it is customary to dampen the paper strip or blank. Owing to the fact that the rate of feed is irregular, and that the strip is frequently permitted to remain at rest, difficulty has been encountered on account of the unequal absorption of moisture, those points which were permitted to remain in contact with the damping device becoming soft and spongy. To remedy this evil, I propose an automatic damping mechanism, in which the damping-roll is held normally out of contact with the paper. The construction to this end will be fully understood upon reference to Figs. 10, 11, and 12. An arm attached to the main frame, or otherwise supported, sustains a horizontal shaft, $p'$, carrying a roller, $q'$, the periphery of which is formed of or clothed with absorbent material and arranged to revolve at the lower side in a vessel, $r'$, containing water or other liquid. The shaft carries, also, a large pulley, $s'$, connected by a belt, $t'$, to a pulley on the shaft of the feed-wheel of the machine, whereby a slow and continuous motion is imparted to the damping-roll $q'$. In rear of the damping-roll there is located a reel, $u'$, on which the paper strip is wound, and from which it is extended over the upper surface of the damping-roll to the machine. The paper strip is held in contact with the damping-roll at the proper time by means of a pressure-roll, $v'$, attached to a pivoted arm, $w'$, which is also provided with two lips or projections, $x'$, lying beneath the paper on opposite sides of the pressure-roll, as shown in Fig. 11, for the purpose of lifting the paper from the damping-roll when required. A stud or projection, $y'$, on the side of the damping-roll acts at each revolution against one end of the pressure-roll $v'$, the effect of which is to elevate the roll and its supporting-arm $w'$, so that the surfaces $x'$ will in turn lift the paper strip from the surface of the damping-roll and maintain it in its elevated position.

For the purpose of sustaining the parts in the position just described I employ a dog or detent, $z'$, arranged to engage automatically under a lip on the arm $w'$. This dog has one of its arms extended toward the machine and arranged to overlie the paper strip, as plainly represented in Figs. 10 and 11. The action is as follows: The machine being in motion, a continuous rotation is imparted to the damping-roll, which is thus damped uniformly around its entire circumference. Whenever the paper is drawn forward by the machine, so as to unwind from the reel, it elevates the end of the dog $z'$, which disengages the arm $w'$, allowing the strip to fall on the surface of the damping-roll, and also allowing the pressure-roll to hold it in contact therewith. The damping-roll makes one revolution while the paper is in contact therewith, thus feeding toward the machine a dampened portion of the strip equal in length to the circumference of the roll. At the completion of the revolution the lip $y'$, operating as before described, serves to lift the paper clear of the damping-roll, in which position it is maintained until the machine has taken up the slackened portion of the paper and drawn the same taut. A spring, $a''$, is applied, as in Fig. 11, to retain the strip in place on the supports $x'$, this spring resting lightly on the strip, and being designed to act as a tension device.

For the purpose of presenting the paper to the damping-wheel in the desired direction, notwithstanding the fact that the roll is constantly diminishing in size, I support the reel on an arm, $b''$, secured frictionally around the bearing or journal of the damping-roll shaft $p'$, as shown in Fig. 12. This permits the reel to be raised and lowered, so as to maintain a uniform direction of the paper.

In order to secure a satisfactory action of the machine it is necessary that the matrix-strip shall be lifted quickly and squarely from the surface of each type or die after being indented thereby. For this purpose I provide a pivoted feed-throat, which is acted upon and depressed by the pressure-dogs F, so as to carry the paper down squarely and positively against the face of the type, and which is lifted by a spring to raise the paper from the type and against a detent, by which its accidental movement is prevented. The throat or guide proper (shown at $c''$, Figs. 2, 5, 6) overlies the type-wheel, and is pivoted at one end to an arm, $d''$, which is in turn pivoted to the frame, so that it may be adjusted to vary the position of the throat. The throat-piece is slotted or grooved lengthwise to permit the passage of the paper strip, which is carried both upward and downward in a positive manner with the throat. At its middle the throat-piece has vertical openings through the upper and lower sides, in order that the type may act on the under side and the pressure-dog upon the upper side of the paper strip during its passage through the throat-piece. In its top there is an opening to admit the end of the fixed detent-arm $g''$, against which the paper is forced and held by the use of the throat-piece. Each pressure-dog or slide passes over the edge of the throat-piece, and in moving inward toward the type carries down the throat-plate, thereby releasing the paper and presenting it to the type. The arm which carries the throat-piece is adjusted and secured by two screws in its end, as shown, or by other suitable means.

The feed-wheel is constructed with as many circumferential series of feed surfaces or projections as there are circumferential lines of type on the wheel, each type being arranged to co-operate with a feed-surface of appropriate width, as in the original machine.

In order to admit of the numerous feed-surfaces being conveniently repaired or replaced by others, I construct the feed-wheel in the manner represented in Figs. 13 and 14. A central hub or body having a cylindrical exterior supports a series of external rings, $k''$, arranged side by side, each ring bearing at its circumference one line or series of spacing surfaces or projections. Each projection or spacing-surface consists of a separate block of hardened steel, dovetailed or otherwise secured within its carrying-ring, in order that it may be readily removed therefrom, when required. The series of rings may be retained in place by means of screws, keys, side plates, or other appropriate devices, the only requirement being that they shall be readily removed from the hub or body of the wheel. This construction affords ready access to any particular spacing-surface in the wheel, permitting the same to be removed or repaired without disturbing or destroying the adjustment of the others in their supporting-ring. If desired, the rings may be replaced by disks or plates extending inward to the central shaft, as represented by dotted lines in Fig. 13.

The essence of the invention as regards the construction of the wheel consists in mounting each circumferential series or row of spacing-surfaces on a separate plate, so that any surface may be removed from its seat without removing those which are located at its sides.

Owing to the fact that the lateral adjustment of the feed and type wheels brings into action different styles or kinds of type, the operator is frequently in doubt as to the type which will be brought into action by the operation of a particular key, each key serving to print one character or another, according to the adjustment of the type-wheel. To avoid this difficulty, I propose to connect with the shifting parts an indicator which will show at all times the style of type which the machine is adjusted to print, and, if desired, the particular character which will be printed by the depression of each key. This indicator may be variously constructed; but I recommend as a simple and satisfactory arrangement that represented in Fig. 15. Two plates, $l''$ and $m''$, are arranged lengthwise of the key-board at its front and rear, and provided in the top with openings $n''$—one opposite each key. Beneath these plates I arrange sliding plates $n^3$, bearing on their faces the various characters which the machine is adapted to print. These lettered slides are slotted and secured in position by guide-screws $o''$, or otherwise arranged so that as they are moved endwise they will expose the various styles of letters through the openings $n''$. I connect the two slides by the rigid arm $p''$, which enters a circumferential groove in the shaft of the feed-wheel, so that when the feed-wheel is moved laterally with the type-wheel, to bring different styles of type into action, it will at the same time move the indicator-slides $n^3$ and present the corresponding type to view in the indicator.

Having thus described my invention, what I claim is—

1. As an improvement in matrix-machines of the type herein described, the frame or bed-plate, in combination with the cylinder carrying the pressure-slides in its periphery, the type-wheel having a common axis with the cylinder, the pressure-wheel acting to apply pressure on the periphery of the type-wheel, bearings for the ends of the cylinder-shaft, a central collar or bearing-surface, $e$, encircling the cylinder and slides at a point between the end bearings, and a support for said collar on the opposite side of the cylinder from the pressure-wheel.

2. In a matrix-machine, in combination with a cylinder, its slides, the type-wheel, and the pressure or feed wheel, the ring $e$, encircling the cylinder and slides, and the vertically-adjustable rolls $f$, acting to sustain the ring.

3. In a machine of the type herein described, the combination of the pressure-wheel and the supporting-standards therefor hinged to the bed-plate, as described, whereby the instantaneous removal of the wheel may be effected to expose the parts thereunder.

4. In combination with the hinged key-board frame and the keys mounted thereon, the locking-bar U for the keys, also mounted on said frame.

5. In a machine of the type herein described, the combination of the bed-plate, the feed-wheel having its shaft movable endwise in bearings, and the lever N, pivoted on the bed-plate and provided with a rigid standard, which directly engages the end of the shaft, as described and shown, whereby the lever is adapted to effect the direct and positive adjustment of the feed-wheel and permit the latter to be lifted out at will.

6. In combination with the laterally-movable feed-wheel and the laterally-movable type-wheel, the hand-lever N, provided with a standard engaging the shaft of the feed-wheel, and the slide O, connecting the lever with the type-wheel, whereby the simultaneous and positive adjustment of the two wheels is effected.

7. In combination with the finger-keys, the locking-bar U, its sustaining-links, the bar d', connected to the links, and the operating-cam c'.

8. In a machine of the type herein described, the improved feed-dog H, consisting of the spindle f' and the removable arm or dog proper, g', constructed substantially as described and shown.

9. In combination with an indenting or printing mechanism, substantially as described, a friction device acting on the paper to control its tension, and governing mechanism, substantially as described, actuated by the machine and controlled by variations in the speed of the machine, to vary the resistance offered by the friction devices to the paper.

10. In combination with a rotary indenting or printing mechanism, substantially as described, a friction-brake to act on the paper strip or blank, and a governor driven by the machine, acting to adjust the brake, as described, whereby an increase in the speed of the machine is caused to effect an increase in the tension of the paper.

11. In a machine such as herein described, the combination of a cylinder, the pressure-dogs or slides F, mounted therein and removable endwise through the slots at the end of the cylinder, and the removable plate or ring t, whereby said dogs are retained in position.

12. In combination with an indenting or printing machine, a damping-wheel, automatic devices, substantially as described, presenting the paper thereto and lifting it therefrom, and a trip actuated by the paper to permit the presentation of the paper to the wheel.

13. In combination with the damping-wheel, the arm w', provided with devices, substantially as described, to lift and depress the paper, the cam to lift said devices, and the trip actuated by the paper to release them.

14. In combination with the type-wheel and the pressure-slides or dogs revolving in unison therewith, the pivoted throat plate or guide, and the spring applied to effect its elevation.

15. In a machine of the type herein described, the improved feed-wheel having two or more circumferential series of feed surfaces or projections, each series mounted on an independent support.

16. In combination with the feed-wheel body, the series of separable independent rings, each provided with a series of feed surfaces or projections, substantially as described.

17. A type-wheel provided with two or more peripheral lines of type and movable laterally to bring one line or another in position for printing, in combination with a reciprocating indicator, substantially as described, connected to and movable laterally with the type-wheel, to show which of the lines of type is in operative position.

18. A type-wheel provided with two or more circumferential lines of type and movable laterally to bring one or another line into position for action, in combination with a series of finger-keys representing the different characters, an intermediate mechanism, substantially as described, whereby the operation of the keys is caused to effect the printing or indenting of corresponding characters, and a laterally-movable indicator located adjacent to the keys and connected with the type-wheel to be moved laterally thereby, said indicator being provided with characters adjacent to the keys to show the particular character and style of character which will be printed by the depression of the key.

19. In combination with the type-wheel and pressure devices, substantially as described, to force the paper against the type, the slotted throat-plate, arranged to be depressed by the pressure device, and the spring to lift the throat when relieved therefrom, substantially as described, whereby the paper is thrown positively into and out of contact with the type.

In testimony whereof I hereunto set my hand in the presence of two attesting witnesses.

FRANK D. MALTBY.

Witnesses:
JOHN T. ARMS,
WM. H. SHIPLEY.